UNITED STATES PATENT OFFICE.

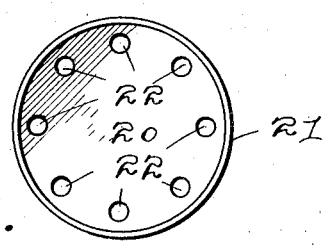
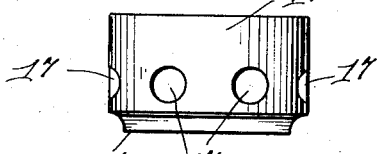
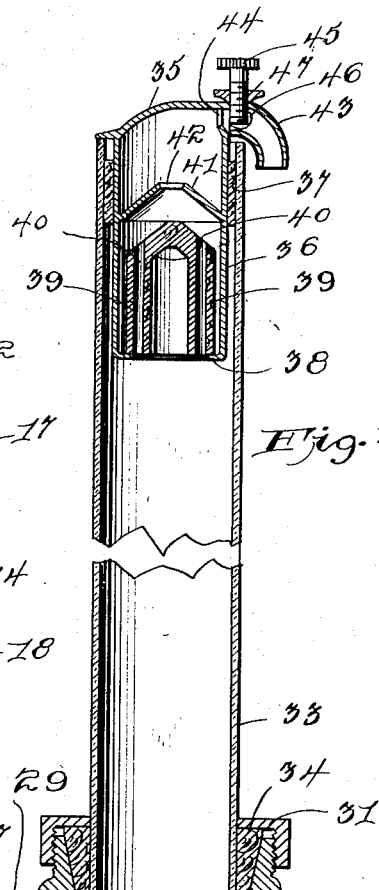
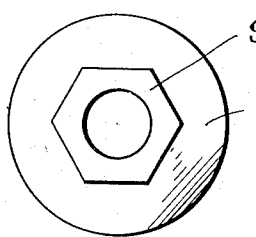
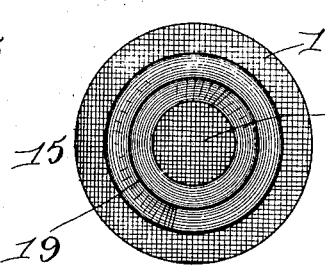
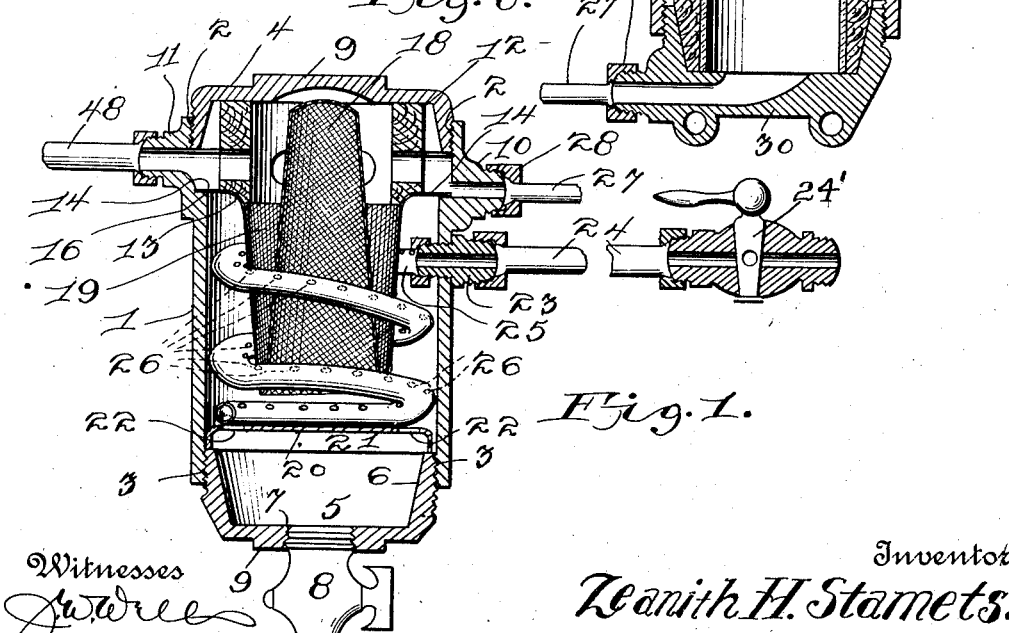
Z. H. STAMETS.
FILTERING APPARATUS FOR PURIFYING GASOLENE AND OTHER LIQUID FUELS.
APPLICATION FILED JUNE 10, 1909.
972,281.  Patented Oct. 11, 1910.

ZEANITH H. STAMETS, OF AUBURN, INDIANA.

FILTERING APPARATUS FOR PURIFYING GASOLENE AND OTHER LIQUID FUELS.

972,281. Specification of Letters Patent. Patented Oct. 11, 1910.

Application filed June 10, 1909. Serial No. 501,396.

*To all whom it may concern:*

Be it known that I, ZEANITH H. STAMETS, a citizen of the United States, residing at Auburn, in the county of Dekalb and State of Indiana, have invented certain new and useful Improvements in Filtering Apparatus for Purifying Gasolene and other Liquid Fuels, of which the following is a specification, reference being had therein to the accompanying drawing.

This invention relates to filters for purifying gasolene and other liquid fuels, and has for its object to provide an improved filter in conjunction with a regulating device by means of which not only will the gasolene or other liquid fuel passing from a supply reservoir through the filter to the apparatus which is to be supplied with the liquid fuel be thoroughly purified and foreign matter separated therefrom and deposited in a receptacle, but also by means of which the flow of the liquid fuel will be regulated and the amount of liquid fuel supplied will be automatically controlled and regulated.

Another object of the invention is to provide a filter in conjunction with a sight gage by means of which not only can the amount of liquid fuel in the main supply tank be readily ascertained and the decrease of the liquid fuel in the main supply tank indicated, but also by means of which an excess of liquid fuel from the main supply tank may be automatically regulated.

Another object of the invention is to provide in conjunction with a filter and a main supply tank containing liquid fuel, a secondary supply reservoir which contains purified liquid fuel.

Other and further objects and advantages of the invention will be apparent from the following detailed description and accompanying drawings.

In said drawings wherein a preferred and practical embodiment of the invention has been shown—Figure 1 is a central vertical sectional view of the improved filter, showing the same equipped with the necessary pipes for connection with a source of fuel supply; a fuel regulator, and the device or other apparatus which is supplied with the purified liquid fuel. Fig. 2 is a similar view of the improved regulator. Fig. 3 is a detail plan view of the bottom plug cap of the filter. Fig. 4 is a plan view of a strainer disk carried by said bottom cap. Fig. 5 is a side elevation of a gasket used in connection with the filter. Fig. 6 is a top plan view of the filter.

Referring to said drawings by numerals, it will be seen that the improved filter is composed of a cylindrical vessel 1 having an open top and bottom, and preferably arranged vertically. The said top and bottom have their inner surfaces threaded, as indicated at 2 and 3 for the reception of sealing plug caps 4 and 5 the flanges of which are externally threaded.

The bottom cap 5 has its inner sides inclined as indicated at 6 so as to permit expansion and contraction of its contents, such for instance as water when the same freezes in cold weather. The central portion of said cap is provided with an opening 7 which is threaded for engagement with the threaded end of a drain cock 8 by means of which the contents of said cap 5 may be readily drawn off. Each of said caps 4 and 5 are provided with a nut formation 9 by means of which they may be readily manipulated to tighten or remove the same.

The upper end portion of the cylinder 1 is provided with oppositely disposed outstanding lateral nipples 10 and 11 which are externally threaded. Said nipples are preferably arranged in different vertical planes. A sealing gasket 12, preferably of cork or other suitable material, is surrounded by the cap 4 and has its flanged lower edge 13 in firm engagement with the outturned annular flat flange 14 of the filter 15, said annular flange 14 resting on and clamped to an annular seat 16 formed in the cylinder 1 by means of said gasket and the cap 4. Said gasket is provided with transverse openings 17 which register with the nipples 10 and 11, the remaining openings 17 communicating with a space around said gasket and permitting the passage of gasolene or other liquid fuel. The said filter 15 is preferably formed of a single piece of closely woven fabric such as fine mesh brass gauze, which is shaped to form a central cone 18 which projects up into said cap 4, and a surrounding cone 19 the upper end of which terminates in the said outturned flat flange 14. The filter extends well down into the cylinder 1 and its lower end terminates slightly above a partition plate or screen 20 horizontally arranged within the cylinder 1 and having an annular downturned annular flange 21 which rests upon the end of the threaded flange of the cap 5. Said plate is provided with a plurality of openings 22 which communicate with the cap 5, said cap obviously forming a sediment chamber.

An outstanding laterally arranged nipple 23 projects from the cylinder 1 adjacent its upper portion, said nipple being provided with a pipe connection 24 which communicates with a liquid fuel supply tank (not shown) and is controlled by a valve 24'. The nipple 23 projects into the cylinder 1 and has a threaded connection with one end of a pipe coil 25 the convolutions of which surround the outer cone 19 of the filter 15 and are provided with small perforations on their upper inner surfaces, as indicated at 26. The outlet end of said coil 25 rests on the plate 20 directly over one of the openings 22 therein so that the discharge from said end will be directly into the cap 5.

A horizontally arranged pipe 27 has a cap coupling 28 with the nipple 10 of the cylinder 1, the outer end of said pipe having a similar coupling 29 with an elbow or union 30 which in turn has a similar cap connection 31 with a vertically disposed gage tube 33, gasket packing 34 preferably of cork being interposed between the coupled end of said tube and said union. The gage tube 33 which is located at a suitable distance from a filter, is preferably of glass and its upper end is sealed by means of a flanged cap 35 having a pendent cage 36 which hangs within said tube. Said cage is retained in spaced relation to the tube by means of an interposed cork gasket 37, and is provided with a flanged bottom 38 forming a seat for a float valve 39 preferably of cork coated with shellac or the like. The float valve 39 is hollow and its upper end is conical and its body is provided with parallel openings 40. A diaphragm 41 extends across the upper portion of the cage, said diaphragm having inclined sides and a central opening 42 which is sealed by said float valve when the latter contacts therewith. A spout 43 projects exteriorly of the cage and overhangs the tube 33, said spout communicating with the cage through a reduced opening 44 formed therein. A set screw 45 projects through the top of the cap 35 and is equipped with a valve 46 for controlling the flow of air through said opening 44. A lock nut 47 may be employed for holding said set screw 45 in pre-determined positions.

The nipple 11 has a threaded engagement with a pipe 48 which communicates with the carbureter (not shown).

The liquid fuel supply tank, not shown, is located in such a position relatively to the gage tube 33 that the top of the liquid in the liquid supply tank will be on a level with the top of the column of liquid in the gage tube 33.

The operation of the device is as follows: After the liquid fuel has been admitted from the main supply tank through the pipe 24 and the coil 25 and the cylinder 1 is filled with liquid, which also extends up into the gage tube 33 to a height equal to the height of the liquid in the main supply reservoir, the gasolene or other liquid fuel in flowing through the coil 25 by means of the circulation of the liquid passing off from the filter through the pipe 48 to the device or apparatus being supplied, passes with a whirling movement to the lower end of the coil 25 and such whirling movement causes, by means of centrifugal force, the heavier particles of foreign matter in the liquid to be carried against the outer side if the inside of the coil opposite to that in which are located the perforations 26, while the lighter particles of the liquid—that is to say, the gasolene or other liquid fuel—passes out of the apertures 26 and toward the center of the filter and through the screen. The heavier particles and the foreign matter held within the coil pass down through the same and out of its lower end, the whirling motion of the flow of the liquid causing the foreign matter so passing out of the coil 25 to be carried to and through the several openings or passageways 22 in the screen 20 and to be deposited in the sediment chamber or cap 5. The liquid in the gage tube 33 is regulated by air admitted through the spout 43, the amount of air admitted being governed by the adjustment of the set screw 45. Said means for regulating the admission of air is preferably employed but that may be dispensed with and the top of the gage tube be entirely open.

The device herein set forth may be used with any device or apparatus to be supplied with purified liquid fuel and is especially adapted for use with automobiles or other gasolene engines. When used with an automobile, the delivery pipe 48 communicates with the carbureter and by means of this invention the foreign matter is entirely separated from the liquid fuel, the carbureter supplied with the purified gasolene and prevented from choking. When used with an automobile, the gage tube 33 supplied with the float valve 39 serves to automatically control and regulate the supply of liquid fuel to the carbureter, when the automobile is at an incline, since when in such a position the liquid fuel from the main supply tank backs into the gage tube 33, the liquid in the tube will cause the float valve to close the opening 42 and thereby prevent a discharge of oil through and out of the upper end of the gage tube 33. Furthermore the flow of liquid through the filter to a carbureter is automatically regulated by the sight gage alone, serving as an auxiliary reservoir, since owing to the fact that the flow of the liquid from the carbureter to the engine is normally irregular on account of the pulsations of the engine, an equal pressure of the liquid between the carbureter and the main supply tank is maintained by the volume of liquid in the sight gage.

If desired, the supply of liquid fuel from the main supply tank may be cut off by closing the valve 24, and in such case the gage tube 33 will serve as a reservoir for the purified liquid fuel.

By means of this invention the filter is self cleaning since the action of the whirling liquid through the perforated coil causes the screen to be kept free from foreign substances.

What I claim as my invention is:—

1. A device of the character described, comprising a cylinder having an outlet port for the discharge of purified liquid fuel at one side of the upper end of the cylinder, an inlet port for the supply of liquid fuel at the upper end of the cylinder at the opposite side from the outlet port; means for causing a whirling downward circulation of said liquid fuel in passing through the casing, and separating the foreign particles from the liquid fuel and depositing them in a sediment chamber and causing the purified liquid fuel to pass centrally downward through the filter, and means for regulating the flow of liquid fuel through the filter and out of the same.

2. In an apparatus of the character described, a filter consisting of a cylinder having a sediment chamber in its lower end, a screen extending over the top of said sediment chamber, an inlet supply port, a coil located in said cylinder and having apertures in its upper inner side, one end of said coil being connected with said inlet port and the other end communicating with the sediment chamber, and an outlet port in the side of said cylinder.

3. In an apparatus of the character described, a filter comprising a casing having inlet and outlet ports opposite each other at the upper end of the cylinder, and a perforated coil located in said cylinder and connected with the inlet port, and having perforations located in the upper inner sides of its coils for creating a whirling and circulating downward movement of the liquid and separating the lighter particles therefrom, and causing the foreign matter in the liquid to be deposited in the bottom of the cylinder.

4. In an apparatus of the character described, a filter comprising a cylinder having inlet and outlet ports, a depending screen in said cylinder, a coil having perforations located in its upper inner side, one end of said coil being connected with the inlet port and the other end being located adjacent to the bottom of the cylinder, a sediment chamber located beneath the lower end of said coil, and a screen extending over the top of said sediment chamber.

5. In an apparatus of the character described, a cylinder provided with inlet and outlet ports, a sediment chamber in its lower end, a perforated diaphragm extending over the top of said chamber, a screen composed of two oppositely-inverted tapering cone-shaped parts, one located within the other, one of said screens having a flange at its upper end and secured to the sides of the cylinder, and the other screen projecting from the bottom of said screen to the top of the main cylinder, a perforated coil connected with the inlet port and extending over the screen, a sight gage and a tubular connection between said sight gage and the upper end of the cylinder above the lower screen.

6. In an apparatus of the character described, a filter consisting of a cylinder having inlet and outlet ports, a sediment chamber in its lower end with an apertured top, a tapering screen member secured to the sides of the upper end of the cylinder and extending downward toward the sediment chamber, a coil having perforations in its upper inner sides and connected at one end to said inlet port, and having its lower open end adjacent to one of the apertures in the top of the sediment chamber, a sight gage consisting of a glass cylinder, a pipe connecting the lower end of said sight gage with the upper end of the cylinder about the screen, a valve air inlet in the upper end of said sight gage, a perforated diaphragm in the upper end of said sight gage, and a float valve normally out of contact with said perforated diaphragm and adapted to automatically close the same when the liquid in the sight gage increases in volume.

In testimony whereof I hereunto affix my signature in presence of two witnesses.

ZEANITH H. STAMETS.

Witnesses:
NAN PETERSON WEST,
H. C. HENRY.